Aug. 26, 1930. W. L. SCRIBNER 1,773,874
RAILWAY CAR AXLE BEARING
Filed Sept. 8, 1928
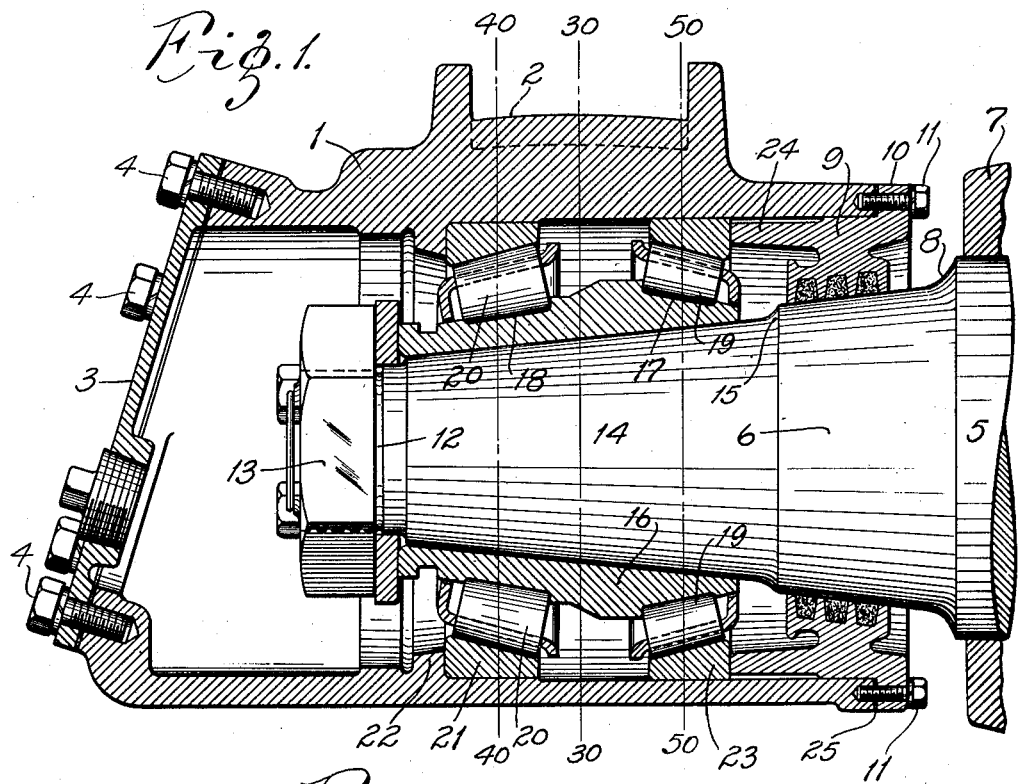
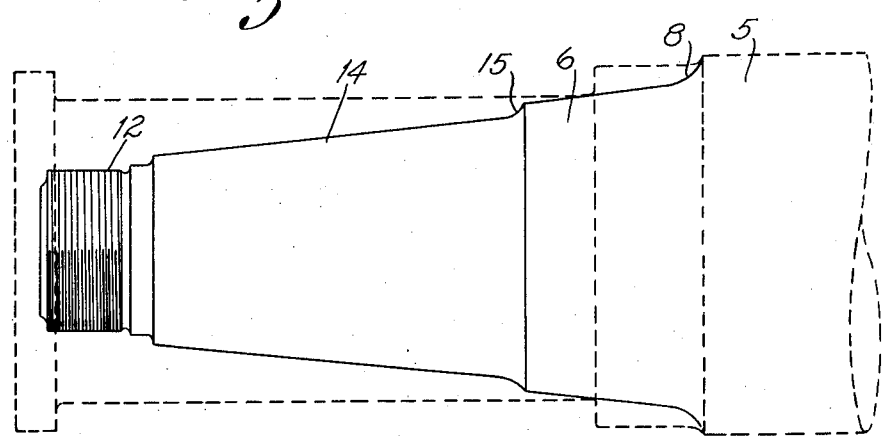
INVENTOR:
William L. Scribner,
by Carr Carr & Gravely,
HIS ATTORNEYS.

Patented Aug. 26, 1930

1,773,874

UNITED STATES PATENT OFFICE

WILLIAM L. SCRIBNER, OF CANTON, OHIO, ASSIGNOR TO THE TIMKEN ROLLER BEARING COMPANY, OF CANTON, OHIO, A CORPORATION OF OHIO

RAILWAY-CAR-AXLE BEARING

Application filed September 8, 1928. Serial No. 304,760.

My invention relates to railway car axle bearings and has for its principal object a construction provided with antifriction bearings and which is interchangeable with present railway car axles using plain bearings.

The invention consists principally in tapering the end portion of a railway car axle and mounting roller bearings thereon, the outermost or larger roller bearing being located closer to the vertical center line of the radial load than is the inner or smaller roller bearing. The invention further consists in the railway car axle bearing and in the parts and combinations of parts hereinafter described and claimed.

In the accompanying drawing,

Fig. 1 is a vertical sectional view of a railway car axle construction embodying my invention; and Fig. 2 is a comparative view of the end portions of my improved axle and an A. R. A. standard axle, my axle being shown in full lines and the A. R. A. standard axle in dotted lines.

The drawing illustrates a journal box 1 conforming to the A. R. A. standard and provided on its top portion with a seat 2 for the truck side frame. The outer end of said journal box is provided with a cover plate 3 secured thereto by cap screws 4.

The axle 5 extends into the inner end of the journal box 1, the portion 6 of the axle adjacent to the seat for the wheel 7 being tapered and a rounded shoulder 8 being formed where the tapered portion 6 merges into said wheel seat. Said tapered portion 6 is of sufficient width to accommodate an annular closure member 9 that is provided with a flange 10 which is secured to the inner end of the housing by screws 11.

To make more room for roller bearings, the axle is again reduced somewhat in diameter adjacent to said closure seat portion 6 and is tapered toward the outer end 12, where it is again reduced and threaded to accommodate a lock nut 13. The outer tapered portion 14 of the axle has substantially the same taper as the inner tapered portion 6 that cooperates with the closure 9 and the two tapered portions merge in a rounded shoulder portion 15.

Mounted on the outer tapered portion 14 of the axle is a double inner race member or bearing cone 16 provided with a raceway 17 at its inner end and with a somewhat larger raceway 18 at its outer end. The bore of said bearing cone is tapered to fit the tapered portion 14 of the axle.

Mounted on the two raceways are roller bearings, tapered rollers being shown in the drawings. The rollers 19 of the innermost series are smaller than the rollers 20 of the outermost series. The cup or outer bearing member 21 of the outermost bearing is mounted in the journal box 1 and is seated against an annular shoulder 22 in the journal box. The cup or outer bearing member 23 for the innermost series of rollers 19 is mounted in the journal box and is positioned by means of an elongated sleeve 24 on said closure member 9. Shims 25 interposed between the end of the journal box and the flange 10 of the closure member permit adjustment of the bearing. The bearings are held in place by means of said lock nut 13 on the threaded end of the axle.

The center of the radial load on the bearings is indicated by a dash and dot line 30—30 passing through the center of the journal box seat and the bearings. It will be noted that the larger rollers are closer to said line than the smaller rollers. This is indicated by dotted lines 40—40 and 50—50 extending vertically through the centers of the two rollers respectively. The larger rollers, of course, have the greater load carrying capacity; and their location as described, causes a greater part of the load to be applied to said larger rollers than is applied to the smaller rollers. Accordingly, each bearing is able to function up to its capacity.

The construction is interchangeable with present A. R. A. standard constructions; and the present standard axle may be easily converted into my improved axle. The construction may be assembled on the bench and the bearings accurately adjusted. The journal box with the bearings therein may then be slipped over the end of the axle and drawn into place by means of the nut on the end of the axle. Likewise the journal box and bearings may be easily removed after the bearing member is loosened from its tapered seat on the axle. The tapered axle construction reduces the sharpness of changes in section ordinarily resulting from reducing the axle diameter.

Obviously, numerous changes may be made without departing from my invention and I do not wish to be limited to the precise construction shown.

What I claim is:

1. A railway car axle bearing comprising a journal box having a seat on which the load of the car rests, an axle extending into said journal box, and an antifriction bearing between said journal box and said axle, said bearing comprising two series of conical rollers and a single inner bearing member having two raceways thereon, the rollers of the outermost series being larger than those of the innermost series, said rollers being disposed so that the vertical plane passing transversely through the center of said seat is closer to the vertical plane passing through the middle of the larger series of rollers than to the vertical plane passing through the middle of the smaller series of rollers.

2. A railway car axle bearing construction comprising a journal box, an axle having a tapered end portion extending into said journal box, an inner race member having a tapered bore fitting the tapered portion of said axle, said race member having two raceways for conical rollers, one of which has substantially the same taper as said tapered end portion of said axle, a series of conical rollers on each raceway, and cups for said rollers mounted in said journal box.

3. A railway car axle bearing construction comprising a journal box, an axle having a tapered end portion extending into said journal box, an inner race member having a tapered bore fitting the tapered portion of said axle, said race member having two raceways for conical rollers, a series of conical rollers on each raceway, and cups for said rollers mounted in said journal box, the rollers of the outermost series being larger than the rollers of the innermost series and said larger rollers being disposed so as to receive the larger portion of the load from said journal box.

Signed at Canton, Ohio, this 5th day of September, 1928.

WILLIAM L. SCRIBNER.